Sept. 5, 1939.  F. W. COTTERMAN  2,171,782
HYDROMECHANICAL TRANSMISSION FOR MOTOR VEHICLES
Original Filed May 13, 1937   2 Sheets-Sheet 2
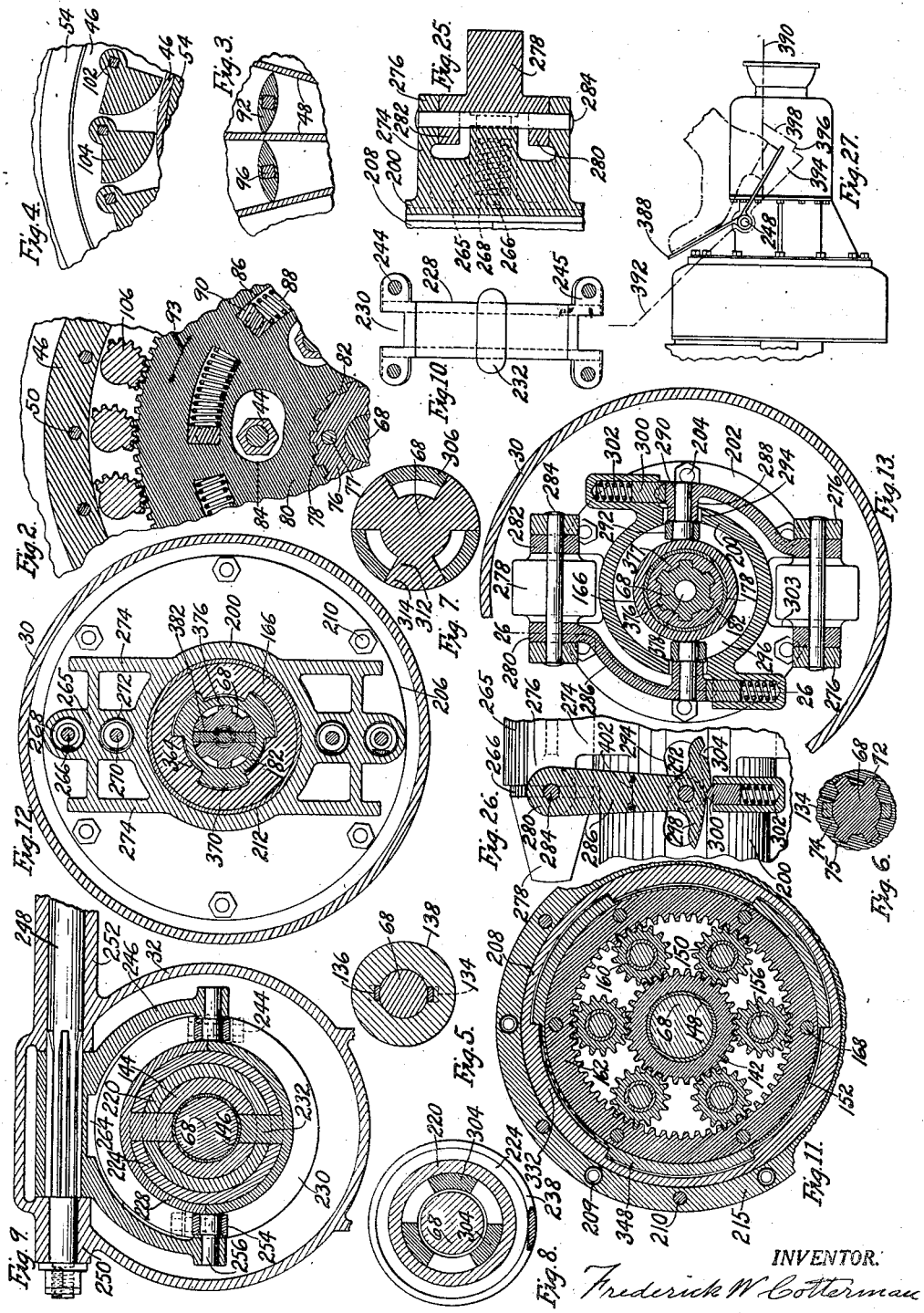
INVENTOR.
Frederick W. Cotterman Patented Sept. 5, 1939

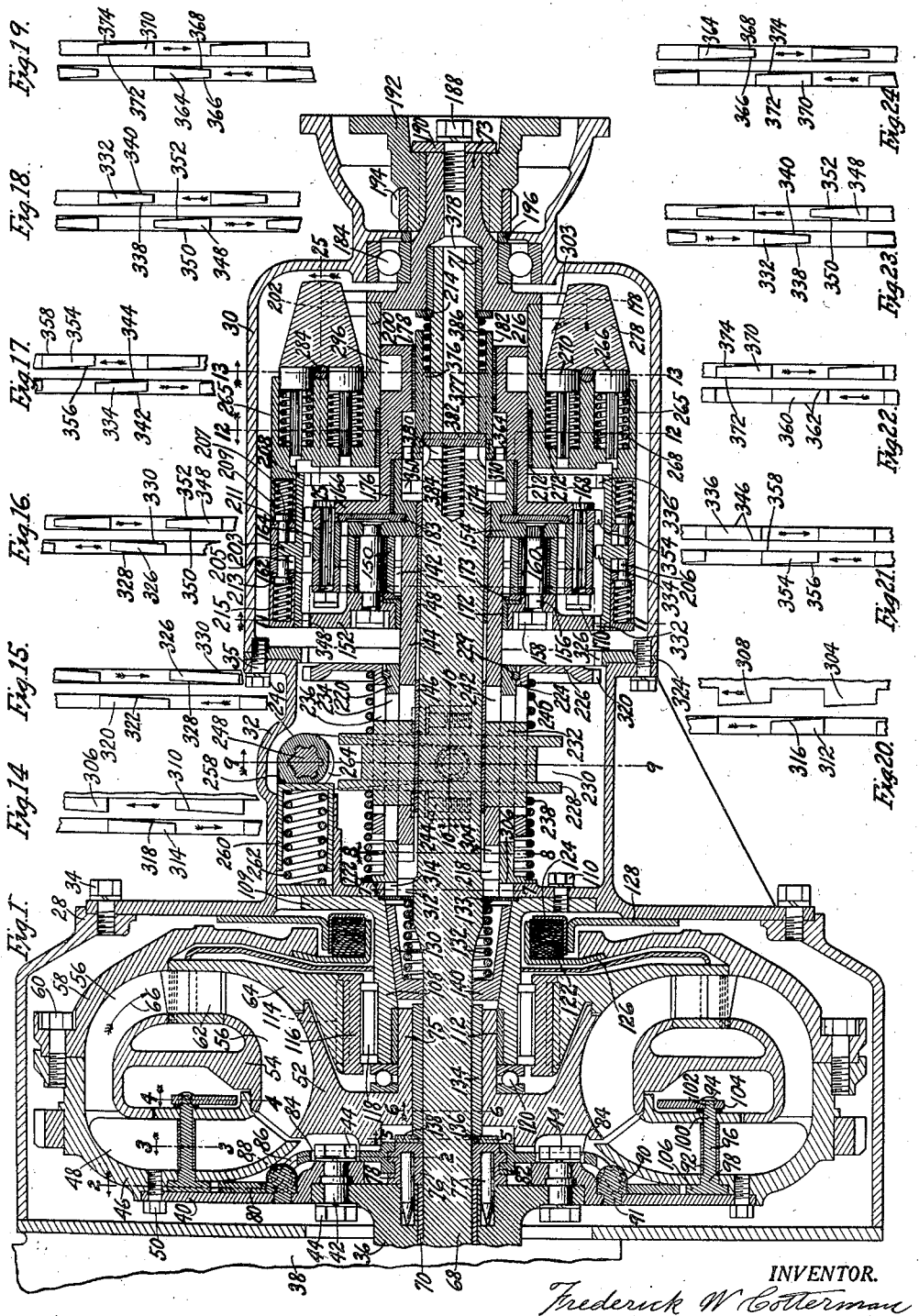

2,171,782

UNITED STATES PATENT OFFICE 2,171,782

HYDROMECHANICAL TRANSMISSION FOR MOTOR VEHICLES

Frederick W. Cotterman, Dayton, Ohio, assignor of one-half to Bessie D. Apple, Dayton, Ohio Original application May 13, 1937, Serial No. 142,464. Divided and this application March 8, 1938, Serial No. 194,637

REISSUED

MAR 12 1940

12 Claims. (Cl. 192—12)

This invention is a division of my copending application, Serial No. 142,464, filed May 13, 1937, and relates to power transmission mechanism for connecting a driving and driven member in variable speed ratio, and particularly to that type of transmission wherein a turbine is combined with toothed gearing to provide a more extended range. It is particularly adapted to automotive use.

As is well known in the art the "Fottinger" fluid coupling, as applied to automotive use, comprises a bladed impeller, driven by the engine, and a bladed rotor placed adjacent and in axial alignment with the impeller, the blades being so shaped that the fluid circulates in corkscrew fashion between impeller and rotor blades. This device functions merely as a coupling or clutch, and while slippage between the impeller and rotor results in speed reduction, there is not, as is usual in speed reducing mechanism, any torque multiplication.

As a result of this shortcoming in the fluid coupling, a turbine mechanism has been proposed wherein the blades of the rotor are cut away for a part of their length and replaced by blades mounted on a separate member having means to hold it against rotation. By this separate member, called a stator, the circulation of the fluid by the impeller between the rotor blades causes the fluid to react against the stator blades whereby the rotor is driven forward at reduced speed and with multiplied torque.

A difficulty in the turbine mechanism proposed is that it is required to act both as a clutch and as a torque multiplier and these two functions are inconsistent.

As a clutch for instance, it is required that if the impeller is rotating say 300 R. P. M. and the rotor 3 R. P. M. there will be substantially zero torque transmission, whereas if the mechanism were a perfect torque multiplier, the torque of the impeller would in this case have been multiplied one hundred fold in the rotor.

To obviate this difficulty in the proposed mechanism, means have been added to restrain the flow of fluid through the impeller by blocking the space between the impeller blades by valves. These valves are normally closed, but are provided with centrifugal weights which act at a predetermined speed to open the valves. By this means the impeller does not act as an impeller until a considerable engine speed is reached.

An inherent difficulty in the proposed mechanism lies in the fact that the rotor and stator blades cannot be so designed as to be efficient over a very wide range of speeds, that is, the efficiency as a torque multiplier is at its highest when the speed between the rotor and stator is that for which the blades were designed. The efficiency, therefore, of the mechanism as a torque multiplier falls off very rapidly both above and below the best speed. It follows that when starting a vehicle from a dead stop, particularly on an up grade, the build up, i. e., the acceleration, is not all that could be desired.

As an aid to this condition, the proposed mechanism has added thereto a planetary gear set comprising, a ring gear, a sun gear and a series of planet pinions in mesh with both the ring gear and the sun gear, the planet pinion carrier being the driven member, the ring gear being optionally connectible by manual means either to the housing to hold it against rotation for a low geared drive, or to the rotor for higher hydraulic drive, the sun gear being connected to the rotor for the low geared drive and to the impeller for the hydraulic drive.

Now the difficulty with the proposed arrangement is to manually shift out of the low geared drive and into the hydraulic drive at the proper time, i. e., at the time the hydraulic unit becomes efficient enough to warrant discontinuance of the geared drive. There is the further difficulty that the mechanism, functioning as a clutch, never releases completely, whereby a manual shift into or out of a toothed connection becomes difficult and necessitates further mechanism to overcome the clutch drag.

It is therefore an object of this invention to provide a combined hydraulic and geared device of the character described with a brake for holding the rotor stationary against the impeller drag, the brake being operable on and off through a mechanical connection between the impeller valves and the brake, whereby, when the valves open to cause the impeller to become effective to drive the rotor, the brake automatically releases the rotor to be driven, to the end that certain connections which are preferably made to the rotor shaft when it is non-rotative may be effected by bringing the engine to the idling speed.

In view of the limited speed range within which the hydraulic portion of the unit described is efficient, it is a further object of the invention to provide a gear box whereby, rather than pull the hydraulic unit down to a ratio at which it multiplies torque at low efficiency, a step down in the gear box may be made to allow the hydraulic unit to operate at less reduction between the impeller and rotor for the same engine to wheel ratio, with means to effect this step down easily, either when the vehicle is at rest, or when it is in motion.

In view of the further fact that the hydraulic unit of the character described is efficient for a greater speed reduction between impeller and rotor when it is not being operated at its maximum capacity, it is further object of this invention to make the step down connection through the gear box manually operable, whereby, when maximum acceleration, or maximum hill climbing power is not desired, the step down connection need not be made.

In view of the fact that vehicle speeds must vary from 5 to 90 M. P. H., whereas the present internal combustion engines may not be varied efficiently over more than one-fourth this range, it is a further object of this invention to extend the ratio variation through the mechanism by employing gear means and connections therefor, whereby there may be had through the gearing, an underdrive, a direct drive and an overdrive ratio, one or another of which is at all times in series with the hydraulic unit, which being responsive to both speed and torque, will vary by infinitesimal ratio changes depending on similar variations in the balance as between the power applied and the vehicle resistance interposed thereto.

It is a further object of the invention to keep the gear box as compact and inexpensive as possible, and to this end a single gear train, comprising an internal ring gear, a sun gear, and planet pinions, is made by certain connections to provide an overdrive, a direct drive, an underdrive and a reverse ratio, the overdrive being controlled by centrifugal means, and the underdrive and reverse by manual means, while direct drive is a normal condition present when neither manual nor centrifugal control is being exercised.

It is a further object to provide, for the manual control, a single pedal of simple construction through which the gearing may be operated to underdrive, reverse, or neutral position, without removing the foot from the pedal.

Other objects and advantages will be more readily seen as the invention is described in detail and reference is had to the drawings, wherein:

Fig. 1 is a longitudinal vertical axial section through the transmission mechanism.

Fig. 2 is a fragmentary section taken at 2—2 of Fig. 1 showing part of the mechanism whereby the impeller valves and the rotor brake are compelled to operate in unison.

Fig. 3 is a fragmentary section taken at 3—3 of Fig. 1 showing several of the impeller blades.

Fig. 4 is a fragmentary section taken at 4—4 of Fig. 1 showing the centrifugal weights for operating the impeller valves and the rotor brake simultaneously.

Fig. 5 is a fragmentary section taken at 5—5 of Fig. 1 showing part of the mechanism for operating the rotor brake.

Fig. 6 is a fragmentary section taken at 6—6 of Fig. 1 showing another part of the mechanism for operating the rotor brake.

Fig. 7 is a fragmentary section taken at 7—7 of Fig. 1 showing the front drive shaft clutch jaws.

Fig. 8 is a transverse section taken at 8—8 of Fig. 1 showing the front sun gear clutch jaws.

Fig. 9 is a transverse section taken at 9—9 of Fig. 1 showing part of the low and reverse operating mechanism.

Fig. 10 is a fragmentary horizontal section taken at 10—10 of Fig. 1 showing the construction of the low and reverse shifting collar.

Fig. 11 is a transverse section taken at 11—11 of Fig. 1 through the planetary gearing and the clutch jaws of the planet pinion carrier.

Fig. 12 is a transverse section taken at 12—12 of Fig. 1 showing the rear drive shaft clutch jaws and a part of the mechanism for connecting the gearing to provide an overdrive.

Fig. 13 is a transverse section taken at 13—13 of Fig. 1 through the centrifugal mechanism for effecting the overdrive connection.

Fig. 14 is a diagrammatic view showing how adjacent faces of clutch jaws carried by the drive shaft and by the sun gear must be beveled to insure smooth shifting into direct drive.

Fig. 15 is a diagrammatic view showing how adjacent faces of other clutch jaws carried by the sun gear and those supported in the housing are beveled to insure smooth shifting into low gear and overdrive.

Fig. 16 is a diagrammatic view showing how adjacent faces of clutch jaws supported in the housing and on the front of the planet pinion carrier are beveled to insure smooth shifting from direct drive to reverse.

Fig. 17 is a diagrammatic view showing how adjacent faces of clutch jaws in the tail shaft cylinder and on the outside of the ring gear carrier are beveled also to insure smooth shifting from direct drive to reverse.

Fig. 18 is a diagrammatic view showing how adjacent faces of clutch jaws on the front of planet pinion carrier and in the tail shaft cylinder are beveled to insure smooth shifting from reverse back to direct drive.

Fig. 19 is a diagrammatic view showing how adjacent faces of clutch jaws at the inner periphery of the ring gear carrier and on the rear end of the drive shaft are beveled also to insure smooth shifting from reverse back to direct drive.

Fig. 20 is a diagrammatic view showing how adjacent faces of the clutch jaws on the front of the drive shaft and on the hub of the sun gear are beveled also to insure smooth shifting from direct drive to reverse.

Fig. 21 is a diagrammatic view showing how adjacent faces of clutch jaws on the outside of the ring gear carrier and on the inside of the tail shaft cylinder are beveled to insure smooth shifting from direct to overdrive.

Fig. 22 is a diagrammatic view showing how adjacent faces of clutch jaws carried at the inner periphery of the rear of the planet pinion carrier and on the rear end of the drive shaft are beveled to insure smooth shifting from direct to overdrive.

Fig. 23 is a diagrammatic view showing how adjacent faces of clutch jaws in the tail shaft cylinder and on the front of the planet pinion carrier are beveled to insure smooth shifting from overdrive back to direct drive.

Fig. 24 is a diagrammatic view showing how adjacent faces of clutch jaws on the rear end of the drive shaft and on the inner periphery of the ring gear carrier are beveled also to insure smooth shifting from overdrive back to direct.

Fig. 25 is a fragmentary section taken at 25—25 of Fig. 1 through the centrifugal mechanism for effecting the overdrive connection.

Fig. 26 is a fragmentary section taken at

26—26 of Fig. 13 through the centrifugal mechanism for effecting the overdrive connection.

Fig. 27 is a side elevation of the device to a reduced scale showing the manual control.

Where a reference character is used to designate a certain part in any view, it is not used to designate a different part in any of the views.

Construction

The housing provided to contain the mechanism is composed of three sections. The forward section 28 contains the hydraulic unit, the rearward section 30 contains the gear set and the centrifugal mechanism for connecting the gearing for overdrive, and the middle section 32 contains the manually operable mechanism for effecting underdrive, neutral and reverse. Screws 34 secure the front and middle housing sections together and screws 35 secure the middle and rear sections together.

Within the forward section, the crank shaft 36 of an engine 38 has the impeller plate 40 secured thereto by the bolts 42 and nuts 44. The impeller 46 has blades 48 and is secured to the plate 40 by screws 50.

The rotor comprises a main body 52, a core 54 and blades 56 arranged in two stages. An impeller cover 58 is secured to the impeller 46 by the screws 60. The cover 58 fits as closely around the rotor blades 56 as will permit rotation at different speeds between the two parts.

At the rearward side, the rotor blades 56 and a small section of the core 54 are cut away to admit the stator blades 62. The stator blades 62 are supported on the stator body 64, and are so angled that movement of a fluid between the rotor blades 56, in the direction of the arrow 66, impinges on the stator blades to drive the rotor forward, by forward being meant clockwise when standing at the left of the drawing.

The rotor shaft 68 has rotative bearing at the forward end of the bearing bushing 70 which is press fitted in the crank shaft 36, and at the rearward end in the bearing bushing 71 which is press fitted in the tail shaft 73. External splines 72, Fig. 6, fit between internal splines 74 of the rotor hub 75 whereby the shaft and rotor always rotate in unison. A collar 76 is fitted to be slidable axially on the shaft 68. Pins 77 press fitted in the collar are slidable in holes in the crank shaft 36 whereby the collar is compelled to rotate with the crank shaft. Collar 76 is provided externally with a coarse pitch thread 78. A gear 80 is internally threaded at 82 to fit over the threads 78 of the collar.

Oblong slots 84 in the gear clear the nuts 44 so that the gear may have slight rotative movement with respect to the plate 40. Arcuate openings 86 through the gear receive the springs 88 and studs 90, the shanks of the studs being riveted in the plate 40 as at 91. The springs 88 always urge the ear 80 in the direction of the arrow 93 with respect to the plate 40.

Between the impeller blades 48 are the butterfly valves 92. The valve stems 94 are squared at 96 where they pass through the valves, rounded at 98 and 100 where they have bearing in the impeller, and squared to a smaller size at 102 where they pass through the centrifugal weights 104. Pinion segments 106 are integral with the stems 94 and are in constant mesh with the gear 80.

A forwardly extending hub 108 having a flange 109 is centrifugally secured to the front of the middle housing section 32 by screws 110. The outside of the rotor hub 75 has rotative bearing in a bushing 112 press fitted into the front end of flanged hub 108. The stator body 64 is held by a key 114 to the stator hub 116 which is internally formed to receive the combination roller bearing and roller clutch 118. The flanged hub 108 is externally formed for the combined clutch and bearing which permits the stator to rotate forwardly but not backwardly.

A thrust bearing 120 holds the rotor in its forward position. A felt seal washer 122 held by retaining members 124, 126 and 128 keeps the hydraulic fluid from leaking out into the housing section 28.

At the rearward end the flanged hub 108 is internally tapered to receive the brake cone 130 which is normally held engaged by the spring 132.

A washer 133 held at its periphery between the flanged hub 108 and the middle housing section 32, receives the reaction of the other end of the spring. The washer 133 also limits end movement of the rotor shaft 68.

The external splines 72 of the rotor shaft 68 are spaced as for six splines but two of the splines have been cut away, (see Fig. 6), and the space thus made between internal splines 74 of the rotor hub slidably receive the keys 134. The keys 134 are notched at their front end at 136 and the washer 138 is correspondingly notched to fit over the key ends. The notched ends of the keys are preferably brazed to the washer 138.

The cone 130 has internal splines 140 slidably fitted to the external shaft splines 72 whereby the cone always rotates with the rotor shaft 68. As long therefore as the spring 132 is expanded, the friction of the cone 130 in the tapered end of the hub 108 keeps the rotor 52 and the shaft 68 from rotating. When, however, the centrifugal weights 104 are caused by sufficient impeller speed to fly out and open the valves 92, the segments 106 turn the internally threaded gear 80, whereupon the externally threaded collar 76 is moved axially rearward against the washer 138 wh'ch pushes the slidably fitted keys 134 against the cone 130 and forces it out of contact with the tapered opening in the hub 108. The opening of the valves 92 for making the impeller effective as such, must therefore always occur simultaneously with the freeing of the rotor 52 by the brake cone 130.

In the forward half of the rear housing section 30 is the planetary gear train. The sun gear 142 has a long forwardly extending hub 144 to the interior of which are press fitted the bearing bushings 146 and 148 which are runningly fitted to the rotor shaft 68. Six planet pinions 150 are equally spaced about, and in mesh with the sun gear. The planet pinion carrier comprises a front section 152 and a rear section 154 between which the pinions are held. Planet pinion studs 156 are riveted in the rear section and held in the front section by the nuts 158. Bearing bushings 160 are press fitted to the inside of the pinions and runningly fitted over the studs.

The gearing preferably has staggered herringbone teeth so there will be no end thrust under load and therefore, to facilitate assembly, the ring gear comprises a front half 162 and a rear half 164, held to the ring gear carrier 166 by bolts 168 and nuts 170.

The front section 152 of the planet pinion carrier has press fitted within it the flanged bearing bushing 172 which has rotative bearing on the hub 144 of the sun gear. An end thrust washer 173 is a press fit on the sun gear hub 144 and extends over the ends of the sun gear teeth whereby the washer always rotates with the sun gear and insures that when the sun gear moves axially on the rotor shaft it must take the carrier with it and vice versa. The rear section 154 of the planet pinion carrier has press fitted therein the bearing bushing 174, which has rotative bearing on the rotor shaft 68.

The ring gear carrier 166 is provided with a press fitted bearing bushing 176 at the forward end and another bushing 178 at its rearward end, the bushing 176 being runningly fitted over the rear carrier section 154 and the bushing 178 runningly fitted over the outside of the rotor shaft rear clutch member 182.

A split washer 183 is clamped at its periphery between the rear half 164 of the ring gear and the ring gear carrier 166. The split washer 183 extends into a groove in the rear section 154 of the planet pinion carrier, its purpose being to restrict relative axial movement between the planet pinion carrier and the ring gear carrier.

A ball bearing 184 supported in the rear housing section 30 provides rotative bearing for the tail shaft 73, the bearing being held to the shaft by the screw 188 acting through intermediate parts 190, 192, 194 and 196. The forward end of the tail shaft has a flange 198.

The overdrive governor frame 200 has a flange 202 at the rear end concentrically held to the tail shaft flange 198 by the screws 204 (see Fig. 13), at the forward end the governor frame is bored to slidingly receive the tail shaft jaw clutch ring 208. Ring 208 has a series of circumferentially spaced ears 203 movable axially in the slots 205 and held positioned midway of the length of the slots by a pair of plungers 206 with heads 207 backed up by springs 209. For convenience in machining and assembly the rings 211, 213 and 215 are separate from the governor frame 200 and are held thereto by the screws 210 (see Fig. 12).

It will be seen that if the jaw clutch ring 208 is moved axially in either direction it will snap back to the position shown. The governor frame 200 is provided internally with the bearing bushing 212 which is runningly fitted over the ring gear carrier 166. Rotation of the ring gear carrier in this bushing is had only while underdrive is in effect, and never during direct drive, overdrive or reverse. The tail shaft 73 is held against rearward axial movement by the ball bearing 184 and against forward axial movement by the washer 214 which rests against a shoulder on the rotor shaft 68.

While neither the tail shaft assembly which includes the tail shaft 73, governor frame 200 and clutch ring 208, nor the rotor shaft 68 have any axial movement in the housing, the entire gear assembly including, the planet pinion carrier and ring gear carrier, are slidable axially on the rotor shaft, rearwardly to take up the space 216 and forwardly to take up the space 218. This axial movement of the gear assembly is utilized to effect various gear connections necessary to the different ratios.

Endwise slidable on the long sun gear hub 144 is a sleeve 220 having at its forward end a small flange 222 and endwise slidable on the sleeve 220 is a second sleeve 224 having a large flange 226, and endwise slidable on the sleeve 224 is the shifting collar 228 having a shifting groove 230 around it. The collar 228 has two oppositely disposed integral keys 232 extending inwardly into slots which extend through the sleeves and the sun gear hub. Because of the keys the sun gear hub 144 and the sleeves 220 and 224 must always rotate in unison.

The slots 234 and 236 which extend through the sleeves 220 and 224 are longer than the keys 232 so that the keys may be moved axially to some extent in both directions from the position shown in the drawings without moving the sleeves directly. When, however, the collar 229 is moved forwardly or rearwardly, the springs 238 or 240 are energized and the sleeves 220 and 224 are urged forwardly or rearwardly by the springs, depending on the position of the collar 228. A spring ring 229 is placed in a groove in the sleeve 220.

This ring prevents the flanges 222 and 226 from moving farther apart than shown in the drawings, but does not prevent them moving closer together against the force of the springs 238 and 240. This feature is important in the functioning of the mechanism as will hereafter appear.

The slots 242 through the sun gear hub 144 are longer than the keys 232 only at the rear of the keys. For this reason the collar 228 may move rearwardly without moving the hub 144. The movement however compresses the spring 240, but if the collar is moved forwardly, it must drag the entire gear assembly forwardly with it. To facilitate assembly, the collar 228 is made in halves held together by the screws 244, (see Fig. 9) extending through ears 245.

A shifting fork 246 is swingable by the splined shaft 248 which has rotative bearing in the hubs 250 and 252 of the middle housing section 32. Rollers 254 (see Fig. 9) are rotatable on studs 256 secured in the free ends of the fork. The rollers 254 fit the groove 230 closely but runningly. The forward side of the shifting fork 246 is flattened at 258 and a hollow plunger 260 is pressed against the flattened surface by the heavy spring 262.

The fork hub is further cut away at 264 so that the springs 262 need not be compressed as much when the collar 228 is moved forwardly as when it is moved rearwardly. The reason for desiring this difference in pressure will later appear.

The overdrive governor frame 200 has two ribs 265, each thick enough to contain a plunger 266 backed up by a heavy spring 268 and a plunger 270 backed up by a lighter spring 272. The frame also carries ribs 274, (see Fig. 12) which terminate at their rear edges in hinge ears 276 (see Figs. 13 and 26).

The governor weights 278 each have a pair of hinge ears 280 and 282 (see Fig. 25), extending forwardly between the frame ears 276. Hinge pins 284 extend through both the frame ears and the weight ears to hingedly support the weights on the frame.

The hinge ear 280 of each weight 278 is prolonged to form the arm 286 which, near its free end, has a hub 288 which carries the stud 290, having a roller 292 rotatable thereon. The hub 288 reaches through an arcuate slot 294 in the governor frame 200 and holds the roller 292 in a circular groove 296 in the rear end of the ring gear carrier 166 whereby inward or outward movement of the weight 278 rocks the arm forward or rearward and thereby moves the gear assembly forward or rearward for making different connections for different ratios.

At the extreme free end of each arm 286 is the segment 298 so shaped that the detent plunger 300 backed up by the spring 302 resists swinging of the arm about the hinge pin in the direction caused by outward movement of the weight, but does not resist swinging of the arm about the hinge pin in the direction caused by inward movement of the weight.

A notch 304 in the edge of the segment tends to keep the arm located in its rearward position when the plunger 300 is pressed into the notch by the spring 302.

Outward movement of the weights 278 is resisted by the heavy springs 268 acting through plungers 266 and by the springs 302 acting through detent plungers 300, while inward movement of the weights is resisted only by the light springs 272 acting through plungers 270. Outward movement of the weights 278 is caused only by centrifugal force, while inward movement occurs only when the gear assembly is drawn by forward movement of the collar 228 acting through the keys 232 against the front end of the slots 242 of the sun gear hub 144. The flanges 198 and 202 are notched at 303 to clear the weights 278.

On the forward end of the long sun gear hub 144 are formed the clutch jaws 304. On the forward end of the sleeve 220 are formed the clutch jaws 306. The faces of the jaws 304 are beveled at 308, Fig. 20, while the faces of the jaws 306 are beveled just oppositely as at 310, Fig. 14.

Integral with the rotor shaft 68 are three segmental lugs (see Fig. 7), the inner halves 312 of which are thicker (see Fig. 1), then the outer halves 314, the inner halves having their faces beveled as at 316, Fig. 20, and the outer halves having their faces beveled just oppositely, as at 318, Fig. 14.

The sun gear jaws 304 are adapted to be received in the spaces between the rotor shaft jaws 312 when the gear assembly is drawn forward by means of the collar 228, while the sleeve jaws 306 are adapted to be received in the spaces between the rotor shaft jaws 314 whenever the spring 238 is energized to a greater extent than the spring 240 which is the condition present when the mechanism is as shown in Fig. 1 of the drawings, i.e., with jaws 306 and 314 meshed.

As above described there are two sets of clutch jaws, both for connecting the sun gear to the rotor shaft, one set having the jaw faces beveled in one direction and the other set having the jaw faces beveled opposite to the first set, the reason being that, under one driving condition, the sun gear must connect to the rotor shaft when the rotor shaft is just passing the sun gear in speed, while under another driving condition the sun gear must connect to the rotor shaft when the sun gear is just passing the rotor shaft in speed.

Around the periphery of the flange 226 are the external clutch jaws 320. The rear faces of these jaws are beveled as at 322, Fig. 15. Clamped between the middle and rear housing sections 32 and 30 by the screws 35 is a clutch ring 324 having internal jaws 326 beveled on their front and rear faces as at 328 and 330, Figs. 15 and 16.

Within the tail shaft clutch ring 208 are three axially spaced sets of jaws, the forward set 332, the middle set 334 and the rear set 336. The forward set 332 has its front end rear faces beveled as at 338 and 340, Figs. 18 and 23. The middle set 334 has its front and rear faces beveled as at 342 and 344, Fig. 17. The rear set 336 has its front and rear faces left straight as at 346, Fig. 21.

At the periphery of the front section 152 of the planet pinion carrier are the jaws 348 (see Fig. 11), beveled on their front and rear faces as at 350 and 352, see Figs. 16, 18 and 23.

At the periphery of the ring gear carrier 166 are the jaws 354, beveled on their front faces as at 356, but plain on the rear faces as at 358, Figs. 17 and 21.

On the outside of the rear section 154 of the planet pinion carrier are the jaws 360, beveled on their rear faces only as at 362, Fig. 22.

On the inside of the ring gear carrier 166 are the jaws 364 (see Fig. 12), beveled on the front and rear faces as at 366 and 368, Figs. 19 and 24.

On the outside of the rotor shaft rear clutch member 182 are the jaws 370, straight on their front faces as at 372 and beveled on their rear faces as at 374, Figs. 19, 22 and 24.

The rotor shaft 68 has splines 376 on the rear end (see Fig. 13), and the clutch member 182 has internal splines 377 axially slidable over the shaft splines. A hole 378 is drilled in the rear end of the shaft 68 and a slot 380 extends crosswise through the shaft and hole. A rectangular bar 382 is freely fitted to the slot and is held to the rear of the slot by the spring 384 which is within the hole 378. The bar 382 has only about half the axial dimension of the slot, whereby the bar may move axially forward against the stress of the spring. The bar 382 not only rests against the rear edge of the slot 380, but its outer ends rest against the ends of two of the internal splines 377 of the clutch member 182.

Surrounding the end of the shaft 68 where there are no splines is the spring 386, one end of which rests against the washer 214 and the other against the ends of the shaft splines 376 as well as the ends of the internal splines 377.

The structure provides means whereby the clutch member 182 is resiliently held in the axial location shown. If it is moved axially forward, the spring 384 will be compressed, but the spring 386 will not further expand, and if it is moved axially rearward, the spring 386 will be compressed but the spring 384 will not further expand. The clutch member 182 will therefore snap back to the exact position shown no matter in which axial direction it has been moved.

Rigidly secured to the outer end of the splined shaft 248 is the pedal 388 (see Fig. 27). The shaft 248 and the hub 252 (see Fig. 9) are prolonged sufficiently to locate the pedal in the position occupied, in conventional practice, by the clutch pedal, i. e., in the position suitable for operation with the driver's left foot. Downward pressure on the pedal by the toe will move the collar 228 rearward to effect the underdrive connection, while downward pressure on the pedal by the heel will move the collar forward for reverse connection.

The floorboard line is at 390 and the toeboard at 392. A pocket 394 is depressed in the floorboard, somewhat wider than the pedal, at the heel end thereof. A neutral position involving complete disconnection of the rotor shaft from the tail shaft is had when the heel end of the pedal is pressed half way down, and, in order to facilitate gauging the halfway position, the projection 396 is formed in the pocket 394. By allowing the foot to slide heelward on the pedal 388 until the back of the heel contacts the rear wall 398 of the pocket, the bottom of the heel will project over the rear end of the pedal and will therefore when pressing downward on the pedal, encounter the projection when the half way down position of the heel end of the pedal is reached.

This position may be required in cold weather for warming the engine when it is desired to rotate it faster than the speed at which the impeller valves open and movement of the vehicle begins.

Proportion

While the mechanism shown may be proportioned for use with any horsepower and vehicle weight within reason, some suggestion as to the proportion for a given vehicle may preferably be given.

If the largest dimension of the housing 28 is taken as 15½" and the other parts made to the same scale, the mechanism will be suitable for an engine of around 100 H. P., in a vehicle of approximately 3500 pound weight.

The planetary gearing are 16 pitch 20 degree pressure angle, 14 degrees 55 minutes helix angle. The ring gear has 60 teeth on a pitch diameter of 3.8808"; the sun gear 30 teeth on a pitch diameter of 1.9404"; and the planet pinions 15 teeth on a pitch diameter of .9702".

The underdrive ratio, provided by making the ring gear the driver, the planet pinion carrier the driven, and the sun gear the stationary member, will then be $$\frac{R+S}{R}=\frac{60+30}{60}=$$

1½ rotor shaft revolutions to one tail shaft revolution.

The overdrive ratio, provided by making the planet pinion carrier the driver, the ring gear the driven and the sun gear the stationary member, will be $$\frac{R}{R+S}=\frac{60}{60+30}=$$

⅔ rotor shaft revolution to produce one tail shaft revolution. The step up in the overdrive ratio to ⅔ or .666 instead of the usual .7 is intended to compensate for the slight slip present in the hydraulic unit even at high speeds.

The reverse ratio, provided by making the sun gear the driver, the ring gear the driven, and the planet pinion carrier the stationary member will be $$\frac{R}{S}=\frac{60}{30}=$$

2 rotor shaft revolutions to produce 1 tail shaft revolution.

With a 4 to 1 rear axle and the hydraulic unit loaded so as to pull it down to a ratio of 2 impeller revolutions to 1 rotor revolution, which is within the efficient range as a torque converter, the total engine-to-wheel ratio through underdrive would be 2×3/2×4=12; through direct drive 2×1×4=8; and through overdrive 2×⅔×4=5⅓. But in either of these gear connections, the torque converter would gradually, as the engine was able to increase its speed under the load, change from 2 to 1, to 1 to 1, whereupon the engine-to-wheel ratio would be, for underdrive 6 to 1; for direct 4 to 1, and for overdrive 2⅔ to 1.

The range of engine-to-wheel ratio change is therefore usually somewhere between 12 to 1 and 2⅔ to 1, depending on to what extent the ratio of the hydraulic unit is pulled down, or allowed to go up by variation between the power being generated and the vehicle resistance being encountered. Similarly the reverse ratio may vary from 16 to 1, to 8 to 1, depending on the resistance encountered.

In the hydraulic unit, the centrifugal weights 104, and the springs 88 and 132 are so proportioned that the weights fly out and open the impeller valves and release the rotor brake at about 600 engine R. P. M. This may of course be varied to suit individual engines.

In the gear box, the centrifugal weights 278 and their restraining springs 268 and 302 are preferably so proportioned that the weights will move to connect for overdrive ratio at around 50 M. P. H. However, since the rear axle ratio must be varied somewhat from the 4 to 1 value given, becoming greater as the vehicle weight is greater and the engine power less, so the overdrive ratio may profitably be varied, i. e., to come in at a lower speed if the proportion of engine power to vehicle weight justifies with the axle ratio selected.

Operation

The normal condition of the mechanism, i. e., the condition which exists when the engine is at rest or operating below 600 R. P. M. is that shown in the drawings, where the centrifugal weights 104 of the hydraulic unit are in their "in" position and the rotor brake 130 is applied, and where the gear mechanism is coupled for direct drive, i. e., for connection between the rotor shaft and tail shaft which compels them to revolve at the same speed. This coupling exists by virtue of the fact that the sun gear and the ring gear are both connected to revolve with the rotor shaft, and the planet pinion carrier is connected to revolve with the tail shaft, no member being held stationary.

The greater percentage of all forward driving will be done with the gear mechanism in direct drive as shown. If, for instance, a driver is starting the vehicle on a substantially level road and is content with good, but not maximum acceleration, he need only depress the engine accelerator whereupon the engine will first increase to 600 R. P. M. open the impeller valves and release the rotor brake, thereby driving the rotor at a less speed and greater torque than the engine.

A hydraulic torque converter similar to that herein shown has already been developed by others to a degree which provides torque multiplication somewhat better than is had with the second gear of a conventional gear box. Inasmuch as many drivers of conventional vehicles start from a dead stop in second gear, such drivers at least would be satisfied with the acceleration obtainable through the hydraulic unit herein shown without further torque multiplication through the gear mechanism.

Other driving conditions, however, require the use of the gearing, as for instance, where the driver has started the engine in the usual manner and it is cold, and he desires to speed up the engine beyond 600 R. P. M. to warm it without driving the vehicle. In this case he allows his foot to slide heelward on the pedal until the back of his heel touches the wall 398 (see Fig. 27). He then presses the heel end of the pedal 388 down until the bottom of his heel strikes the projection 396. In doing this he has drawn the gear assembly forward with the collar 228 until the jaws 348 of the carrier section 152 are out of engagement with the tail shaft jaws 332 but not far enough to have engaged the stationary jaws 326. Similarly the jaws 364 of the ring gear carrier have moved out of engagement with the jaws 370 of the clutch member 182. The sun gear jaws 304 have moved forward but not enough to engage the jaws 312 of the drive shaft. In this condition there is no driving connection between the rotor shaft and tail shaft. In this neutral position the engine may be speeded up and warmed.

Assuming that the driver next desires to back the vehicle. To do this he first lowers the engine R. P. M. to the idling speed by releasing the accelerator pedal, then places his foot on the pedal 338 as shown in Fig. 27 and presses the heel downward. To make the reverse connection the jaws 304 of the sun gear must mesh with the jaws 312 of the rotor shaft, the jaws 348 of the planet pinion carrier must mesh with the jaws 326 of the stationary ring, and the jaws 354 of the ring gear carrier must mesh with the jaws 334 of the tail shaft ring. The connections shown in the drawing between the planet pinion carrier and the tail shaft and between the ring gear carrier and the rotor shaft will, of course, be first unmade.

Since it is highly improbable that all these sets of jaws to be meshed will be in meshing alignment when the heel is pressed downward, it follows that the faces of at least some of the jaws will come together, but power is now applied to turn the rotor shaft, whereupon the first set to be meshed will have relative movement as indicated by the arrows in Fig. 20, the second set will have relative movement as indicatd by the arrows in Fig. 16, and the third set have relative movement as indicated by the arrows in Fig. 17.

The space 218 (see Fig. 1), through which the jaws 304 must move to reach the jaws 312 is slightly less than the spaces through which the other jaws to be meshed must move, so that the rotor shaft motion will always start the sun gear rotating first.

Rotation of the remaining jaws to be meshed will naturally follow, and, the faces being beveled as shown, the jaws will move, each down the beveled faces of the other into mesh, if a slight foot pressure is maintained after the accelerator is depressed. Should the jaws 348 become aligned with the jaws 326 before the jaws 354 become aligned with the jaws 334, the jaws 348 may at once enter because of the yieldable manner in which the jaws 334 are held positioned by the springs 209 and plunger heads 207.

When the gear assembly is drawn forward as above explained to make the reverse connection, the ring gear carrier groove 296 (see Fig. 1), is, of course drawn forward with it. The roller 292, being in the groove 296, swings the arm 286 in the direction of the arrow 402, Fig. 26, and causes the weight 278 to swing inwardly against the plunger 270 and spring 272, Fig. 1. The low speed at which a vehicle is driven backward produces a very slight centrifugal force in the weights 278 which must be overcome by the pedal along with the force of the spring 272.

In order to lessen the force necessary to press down the pedal for reverse connection, the shifting fork 246 is cut away as at 264, so that the spring 262 is compressed less in pressing the pedal 388 with the heel than when pressing it with the toe. The springs 238, 262 and 272, each provide part of the resistance offered to the pedal in making the reverse connection.

Assume that the vehicle has been moved backwardly as desired and the pressure is removed from the pedal to allow it to return to the normal position shown in Fig. 27. This should remake the direct drive connection. The expansion of the springs 238 and 262 immediately return the pedal and the collar 228, but unless both sets of jaws which have to be reengaged are in meshing alignment, which is unlikely, the spring 272 may not instantly expand, but will hold the faces of the jaws together resiliently until they may mesh. The jaws which must be remeshed when shifting out of reverse back to direct are, the carrier jaws 348 with the tail shaft jaws 332, and the ring gear jaws 364 with the rotor shaft jaws 370.

When release of the heel pressure from the pedal has allowed the faces of these two sets of jaws to be resiliently pressed together, the power may be applied to turn the rotor shaft, whereupon relative motion of the jaws 348 with 332 and of the jaws 364 with 370 will be according to the arrows in Figs. 18 and 19 respectively. By reference to Figs. 18 and 19, it will be seen that the faces of the jaws seeking engagement are so beveled that when they are held together resiliently and rotation started, the jaws will slide down the inclined faces into mesh.

If, during the above reentry, the jaws 348 and 332 are aligned for reentry with each other before the jaws 364 and 370, or vice versa, the fact that the jaws 332 and the jaws 370 are yieldably held to the positions shown by springs 209 and 386 respectively, will permit either to mesh ahead of the other.

It will be apparent that it would not be best to have two sets of jaws which must be meshed at the same time unless each set was independently sprung, inasmuch as a rotating condition might be had where, when either set of jaws were aligned to enter, they would be held apart because of the fact that the other set was at that time misaligned. It is at least apparent that entry of two sets may be more readily made if each is individually sprung.

Assume the driver now wishes to use underdrive to move the vehicle forward with maximum acceleration. For making this connection he presses the pedal 388 all the way down with the toe end of his foot. The first result had is, that the collar 228 moves rearward and its keys 232 move in spaces 234, 236 and 242. The gear assembly does not move because the springs 268 and 272 acting on the plungers 266 and 270 hold the arm 286 and roller 292 rigid. The slots 242 in the sun gear hub are of such length that, at maximum pedal depression, the keys 232 just touch the rear ends of the slots, but the slot 234 is so much shorter than the slot 242 that the maximum pedal depression causes the keys 232 to pull the jaws 306 half out of mesh with the jaws 314. Now by considering Figs. 14 to 24, it will be seen that the amount of bevel on the sides of the beveled jaws is one-fourth the whole jaw thickness. It follows that when a pair of such jaws are meshed half way or less they drive in one direction but will overrun in the other. They will drive in one direction but ra'chet over in the other direction up to half way mesh, but either one will drive both directions after it is more than half way meshed.

Besides having pulled the jaws 306 half out of mesh with the jaws 314 and made a one way drive of them, the pedal depression also greatly increased the stored energy in the spring 240 and caused it to resiliently hold the faces of the jaws 320 against the faces of the jaws 326.

If the power is now applied, the rotor shaft will drive the ring gear because the rotor shaft jaws 370 and ring gear jaws 364 are fully meshed. The vehicle resistance now tries to hold the tail shaft, and consequently the planet pinion carrier, from rotating, which results in the sun gear starting to rotate backwardly, which it may do because the jaws 306 may ratchet backwardly over the jaws 314 (see Fig. 14), their relative movement being according to the arrows Fig. 14, but after about one-sixth revolution of the sun gear, the jaws 320 also starting backwardly (see Fig. 15), will have followed the inclined faces 322 and 328 and entered into mesh.

Now the snap ring 229 is so placed that when the jaws 306 are pulled half way out of mesh the jaws 320 may go half way into mesh but not farther, and when the jaws 320 move more than half in, the jaws 306 are drawn more than half out, so that by the time the jaws 320 are fully meshed, the jaws 304 are fully unmeshed.

The foregoing described a shift from direct to underdrive when the vehicle was at rest, but it is also desirable that a shift from direct to underdrive may easily be made at high vehicle speed, as for instance, when a steep grade is encountered.

In such a case the operator preferably first releases the accelerator pedal momentarily, then depresses the toe end of the control pedal, thereby pulling the jaws 306 half out of mesh as well as pressing the faces of the jaws 320 resiliently against the faces of the jaws 326.

The accelerator being released, the vehicle movement tries to rotate the sun gear forwardly but the half meshed jaws 306 prevent the sun gear rotating forwardly faster than the engine, that is, they drive the engine by vehicle momentum. The jaws 320, moving forwardly will of course ratchet over the jaws 326 (see Fig. 15), until power is applied to the engine, whereupon the sun gear tries to rotate backwardly, and when it does, the full meshing of the jaws 320 and 326 takes place for underdrive as before explained. It will be seen that in the transition period there was no free wheeling, that is, the vehicle still drove the engine after the pedal was operated and the engine drove the vehicle as soon as power was applied. There is no point at which the engine and vehicle are completely separated as they are in the shift of common practice.

Now if, while operating in underdrive at high speed, it becomes desirable to return to direct drive, the control pedal is merely released and the collar 228 will return to the normal position shown in the drawings. Although the springs 238 are now placed in much greater stress than the springs 240, the jaws 320 may not move out of mesh with the jaws 326 until the accelerator is sufficiently released to relieve the friction between the driving surfaces of the jaws.

When, however, the tension between these driving faces is relieved, the jaws 320 will be drawn half way out of mesh, by engagement of the forward end of key 232 with the forward end of the slot 236, and the faces of the jaws 306 pressed resiliently into contact with the faces of the jaws 314. Inasmuch as the sun gear was non-rotative when the accelerator was released, the jaws 314 may ratchet over the non-rotating jaws 306 (see Fig. 14), even though they are half meshed, until the engine speed reduces to a point where the vehicle tries to drive the engine, whereupon the sun gear will try to rotate forwardly and the jaws 306 will slide down the inclined faces of the jaws 314 and into mesh. When they are halfway meshed, the spring ring 229 encounters the shoulder in the sleeve 236 and the jaws 320 are pulled clear out of mesh as the jaws 306 go clear into mesh.

The overdrive gear connection will be made automatically whenever the accelerator is released if the vehicle is moving faster than 50 M. P. H. The operation of shifting up to overdrive is as follows:

When the gearing is in direct drive as shown in the drawings, and the vehicle speed exceeds 50 M. P. H., the centrifugal force of the weights 278 must be sufficient to overcome the governor springs 268, the detent spring 302 and the pedal return spring 262. If the accelerator is now released, so as to remove the friction from the jaws which are carrying the load, the weights will move out and, through the arms 286 and rollers 292, draw the entire gear assembly rearward. The straight faces 358 of the ring gear jaws 354 are pressed against the straight faces 346 of the rear tail shaft jaws 336 (see Fig. 21).

Similarly, the straight faces 362 of the planet pinion carrier jaws 360 are pressed into contact with the straight faces 372 of the rear drive shaft jaws 370 see Fig. 22). Since all of these jaws are revolving at the same speed when pressed together there is no necessity of having the faces of these jaws beveled to permit overrunning, but unless these two sets of jaws are aligned for entry, the jaws 336 and 370 will be displaced rearwardly, against the resistance of springs 209 and 386 respectively, a distance equal to their thickness, in order that the weights 278 may move all the way out at once.

The weights in thus moving out and moving the gear assembly rearward, also draw the collar 228 rearward and the toe end of the control pedal 388 down exactly as they are operated manually when shifting from direct to underdrive, the jaws 314 being pulled half out of mesh to ratcheting position and the jaws 320 being resiliently held against the jaws 326.

Dropping of the engine speed now produces relative movement of the jaws 314 and 306 as in Fig. 14, and relative movement of the jaws 320 and 326 as in Fig. 15. The remaining jaws 354 with 336, and 360 with 370 which are pressed together resiliently may drive by friction sufficiently to turn the jaws 320 to meshing position (see Fig. 15), or, if they slip ever so slightly, they will mesh positively and drive directly. In either event, a pause of a second or two after the weights 278 move out will cause all connections for overdrive to be made.

When the vehicle speed is lowered to about 45 M. P. H., which may be made as much less as desired by using a stronger spring 302 back of the detent plunger 300, the weights, upon release of the accelerator pedal, will move in, returning the gear assembly and the collar 228 and pedal 388 to the normal position shown in the drawings. Three sets of jaws are again pressed together resiliently, 306 against 314 (see Fig. 14), 348 against 332 (see Fig. 23), and 364 against 370 (see Fig. 24). Ratcheting between the several jaws of each pair will occur, the relative movement being as indicated by the arrows in Figs. 14, 23 and 24, until the rotor shaft speed again is brought up to the tail shaft speed which may be done by a touch of the accelerator pedal.

While the mechanism herein shown and described includes a hydraulic torque converter with a mechanical gear-set in series and is thus shown in order to disclose a complete operative structure, the following claims are drawn to the novel features of the hydraulic unit only, claims to the gear-set being contained in the parent application hereinbefore referred to.

I claim—

1. In a fluid coupling of the Fottinger type comprising, an impeller and a rotor, the combination with means operative to substantially block circulation of the fluid, braking means to hold the rotor non-rotative while said blocking means is operative, and means responsive to impeller speed to simultaneously operate the blocking means to inoperative position and the braking means to released position.

2. In power transmission mechanism, an impeller, a rotor adapted to be driven by said impeller, valve means for closing the spaces between the impeller blades, a brake for holding the rotor against rotation, speed responsive means for opening said valve means at a predetermined impeller speed, and means connecting said valve means and said brake whereby opening said valve means releases said brake.

3. A fluid coupling of the Fottinger type comprising an impeller and a rotor in combination with means applicable to substantially block circulation of the fluid, braking means applicable to hold the rotor non-rotative while said blocking means is applied, and a centrifugal device rotated by the impeller and operative at a predetermined speed to simultaneously release said blocking and said braking means.

4. Hydromechanical power transmission mechanism comprising, in combination, an impeller, a rotor, valve means normally closed to prevent circulation of fluid between the impeller and rotor, a brake holding the rotor non-rotative, and a centrifugal device operative at a predetermined speed to simultaneously open the valve means and release the brake.

5. Fluid transmission mechanism of the character described having an impeller and a rotor in combination with means normally retarding circulation of fluid therebetween, means normally restraining rotation of the rotor, a normally unoperated speed responsive device, and means connecting the said retarding and restraining means to the speed responsive device, whereby operation of the speed responsive device releases said retarding and said restraining means.

6. A fluid power transmission device comprising in combination, a bladed impeller, a rotor, valve means adapted to close the space between the impeller blades to keep it inactive, a brake holding the rotor non-rotative, centrifugal weights on the impeller operable outwardly to open said valve means, and means connecting said valve means and brake whereby operation of said weights opens the valves and releases the brake.

7. A fluid power transmitting device comprising, in combination, a bladed impeller, a rotor, valves between the impeller blades closed to keep the impeller inactive, a brake holding the rotor non-rotative, centrifugal weights on the valves operable at a predetermined speed to open the valves, and operating means between the valves and the brake whereby operation of the valves releases the brake.

8. A hydromechanical power transmitting device comprising, an impeller, a rotor, butterfly valves between the impeller blades closed to keep the impeller inoperative, a brake holding the rotor non-rotative, centrifugal weights on the stems of the butterfly valves swingable outwardly at a predetermined speed to open said valves, and means connecting the valves and said brake whereby opening said valves releases said brake.

9. The combination, in a hydromechanical power transmitting device, of an impeller, a rotor, butterfly valves closing the spaces between the impeller blades, centrifugal weights on the stems of the butterfly valves swingable about said stems at a predetermined impeller speed to open said valves, pinions on the said valve stems turnable by opening of said valves, a gear in mesh with said pinions, a brake holding said rotor non-rotative, and means connecting said gear and said brake whereby turning of said gear releases said brake.

10. In combination, an impeller, a rotor, butterfly valves closing the spaces between the impeller blades, centrifugal weights on the stems of said valves for rotating said valves to open position at a predetermined impeller speed, pinions on said stems, a gear in mesh with said pinions, a brake holding said rotor non-rotative but operable axially to release said rotor, and means operative by rotation of said gear to create an axial pressure against said brake to release said brake.

11. In combination, an impeller, a coaxial rotor, axially parallel stems between the rotor blades, butterfly valves on said stems, centrifugal weights on said stems swingable outwardly to rotate said stems and open said valves, pinion segments on said stems, a coaxial gear in mesh with said pinion segments, screw and nut means operable axially by rotation of said gear, an axially applied brake holding said rotor non-rotative, and means connecting said screw and nut means to said brake whereby operation of said weights opens said valves and releases said brake.

12. Fluid power transmission mechanism comprising, in combination, a bladed rotor, a coaxial bladed impeller having shrouds on each side of the blades, axially parallel stems between the impeller blades having rotative bearing in said shrouds, butterfly valves on said stems closing the spaces between the impeller blades, centrifugal weights on said stems outside one of the shrouds and swingable outwardly to rotate said stems and open said valves, pinion segments on said stems outside the other said shroud, a coaxial gear in mesh with said pinion segments and rotatable thereby, screw and nut means associated with said gear operable axially by rotation of said gear, a brake element carried by said rotor urged axially into engagement with a non-rotatable element to hold said rotor non-rotative, resilient means urging said brake element axially into engagement, and means extending from said screw and nut means to said brake element operable, by axial movement of said screw and nut means, to move said brake element against said resilient means to release said brake.

FREDERICK W. COTTERMAN.